United States Patent
Lee et al.

(10) Patent No.: US 8,045,813 B2
(45) Date of Patent: Oct. 25, 2011

(54) IMAGE ENCODING AND DECODING METHOD AND APPARATUS USING MOTION COMPENSATION FILTERING

(75) Inventors: Kyo-hyuk Lee, Yongin-si (KR); Mathew Manu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 963 days.

(21) Appl. No.: 11/958,493

(22) Filed: Dec. 18, 2007

(65) Prior Publication Data

US 2008/0240592 A1 Oct. 2, 2008

(30) Foreign Application Priority Data

Mar. 28, 2007 (KR) .................. 10-2007-0030381

(51) Int. Cl.
*G06K 9/36* (2006.01)
*G06K 9/40* (2006.01)
*G06K 9/46* (2006.01)

(52) U.S. Cl. .................... 382/238; 382/260

(58) Field of Classification Search .............. 382/209, 382/232, 233, 236, 238, 239, 260–264, 268, 382/305; 375/240.12, 240.16, 240.2, 240.24, 375/240.27, 240.29, E7.123, E7.124, E7.166, 375/E7.193, E7.243; 348/397.1, 403, 416, 348/441, 699, E7.16, E5.66

See application file for complete search history.

(56) References Cited

U.S. PATENT DOCUMENTS

| | | | | |
|---|---|---|---|---|
| 5,539,466 A | * | 7/1996 | Igarashi et al. | 375/240.15 |
| 5,581,308 A | * | 12/1996 | Lee | 348/699 |
| 5,689,306 A | * | 11/1997 | Jung | 375/240.16 |
| 6,175,592 B1 | * | 1/2001 | Kim et al. | 375/240.16 |
| 6,539,120 B1 | * | 3/2003 | Sita et al. | 382/233 |
| 6,937,659 B1 | * | 8/2005 | Nguyen et al. | 375/240.19 |
| 7,746,930 B2 | * | 6/2010 | Sato et al. | 375/240.16 |
| 2002/0031272 A1 | | 3/2002 | Bagni et al. | |
| 2003/0031261 A1 | * | 2/2003 | Valente et al. | 375/240.27 |
| 2003/0058949 A1 | | 3/2003 | MacInnis et al. | |
| 2005/0031211 A1 | | 2/2005 | Meur et al. | |
| 2005/0207496 A1 | * | 9/2005 | Komiya et al. | 375/240.16 |
| 2006/0147123 A1 | * | 7/2006 | Kajihata | 382/239 |
| 2006/0280372 A1 | * | 12/2006 | Han | 382/240 |
| 2008/0130749 A1 | * | 6/2008 | Tsai et al. | 375/240.16 |

(Continued)

FOREIGN PATENT DOCUMENTS

CN 1465193 A 12/2003

(Continued)

OTHER PUBLICATIONS

Communication from the State Intellectual Property Office of P.R. China dated Mar. 30, 2011 in a counterpart application No. 200880009647.3.

*Primary Examiner* — Amir Alavi

(74) *Attorney, Agent, or Firm* — Sughrue Mion, PLLC

(57) ABSTRACT

Provided are an image encoding method and apparatus for encoding image data, in which compression efficiency is further improved by filtering motion-compensated image data, thereby reducing errors with respect to original image data, and an image decoding method and apparatus for decoding encoded image data. A filter is generated using previously decoded surrounding pixels of a current frame and surrounding pixels of a reference frame, and prediction data is then filtered using the generated filter. Therefore, it is possible to decrease a size of residual data to be encoded.

19 Claims, 9 Drawing Sheets

U.S. PATENT DOCUMENTS

| | | | |
|---|---|---|---|
| 2008/0175322 A1* | 7/2008 | Lee et al. | 375/240.16 |
| 2008/0232705 A1* | 9/2008 | Sohn et al. | 382/238 |
| 2008/0240592 A1* | 10/2008 | Lee et al. | 382/238 |
| 2009/0232208 A1* | 9/2009 | Lee et al. | 375/240.12 |
| 2010/0284467 A1 | 11/2010 | Sekiguchi et al. | |

FOREIGN PATENT DOCUMENTS

| | | |
|---|---|---|
| JP | 2004-147328 A | 5/2004 |
| JP | 2005-318297 A | 11/2005 |

* cited by examiner

IMAGE ENCODING AND DECODING METHOD AND APPARATUS USING MOTION COMPENSATION FILTERING

CROSS-REFERENCE TO RELATED PATENT APPLICATION

This application claims priority from Korean Patent Application No. 10-2007-0030381, filed on Mar. 28, 2007, in the Korean Intellectual Property Office, the disclosure of which is incorporated herein in its entirety by reference.

BACKGROUND OF THE INVENTION

1. Field of the Invention

The present invention relates to image motion prediction and compensation, and more particularly, to an image encoding and decoding method and apparatus in which compression efficiency is further improved by filtering motion-compensated image data, thereby reducing errors with respect to original image data.

2. Description of the Related Art

In image compression schemes such as moving picture coding experts group (MPEG)-1, MPEG-2, MPEG-4, H.264/MPEG-4 advanced video coding (AVC), pictures are divided into macro blocks to encode images. Each macro block is subject to inter-prediction or intra-prediction by using the various encoding modes. Thereafter, one of these encoding modes is selected to encode each macro block according to a bit rate required for macro block encoding and according to a distortion degree between a decoded macro block and an original macro block.

In intra-prediction, a prediction value of a current block to be encoded is computed using pixel values of pixels located around the current block, and a difference between the prediction value and an actual pixel value of the current block is encoded. In inter-prediction, a motion vector is generated by searching for a region that is similar to the current block to be encoded in at least one reference picture that precedes or follows the current picture to be encoded, and a differential value between a prediction block generated by motion compensation using the generated motion vector and the current block is encoded.

Conventionally, either intra-prediction or inter-prediction is used to generate a prediction block for a current block, and cost is then computed using a specific cost function. Thereafter, the most inexpensive encoding mode is selected to perform encoding, which leads to improved compression efficiency.

However, to overcome limited transmission bandwidth and to provide high quality images, an image encoding method having an even higher compression efficiency is required.

SUMMARY OF THE INVENTION

The present invention provides an image encoding method and apparatus for encoding image data, in which motion-compensated prediction data is filtered to reduce a difference between motion-compensated prediction data and original image data, and an image decoding method and apparatus for decoding encoded image data.

The present invention also provides an image encoding method and apparatus for encoding image data, in which filtering information can be effectively transmitted to a decoding apparatus without having to provide additional information when motion-compensated prediction data is filtered, and an image decoding method and apparatus for decoding encoded image data.

According to an aspect of the present invention, there is provided an image encoding method including: generating a motion vector of a current block to be encoded using motion prediction of the current block; generating a prediction block for the current block using motion compensation for obtaining a corresponding block of a reference frame indicated by the motion vector; filtering the prediction block generated using the motion compensation; and encoding a difference between the filtered prediction block and the current block.

According to another aspect of the present invention, there is provided an image encoding apparatus including: a motion predictor generating a motion vector of a current block to be encoded through motion prediction of the current block; a motion compensator generating a prediction block for the current block using motion compensation for obtaining a corresponding block of a reference frame indicated by the motion vector; a filtering unit filtering the prediction block generated using the motion compensation; and an encoder encoding a difference between the filtered prediction block and the current block.

According to another aspect of the present invention, there is provided an image decoding method including: generating a prediction block for a current block to be decoded through motion compensation using a motion vector extracted from a received bit-stream; generating a filter to be used for the prediction block using a correlation between surrounding pixels around the current block and surrounding pixels around a corresponding block of a reference frame indicated by the motion vector; generating a filtered prediction block by filtering the prediction block using the filter; and restoring the current block by adding the filtered prediction block and a restored residual.

According to another aspect of the present invention, there is provided an image decoding apparatus including: a motion compensator generating a prediction block for a current block to be decoded through motion compensation using a motion vector extracted from a received bit-stream; a filtering unit generating a filter to be used for the prediction block using a correlation between surrounding pixels around the current block and surrounding pixels around a corresponding block of a reference frame indicated by the motion vector, and generating a filtered prediction block by filtering the prediction block using the filter; and an adder restoring the current block by adding the filtered prediction block and a restored residual.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described with reference to the accompanying drawings.

Figure 1:
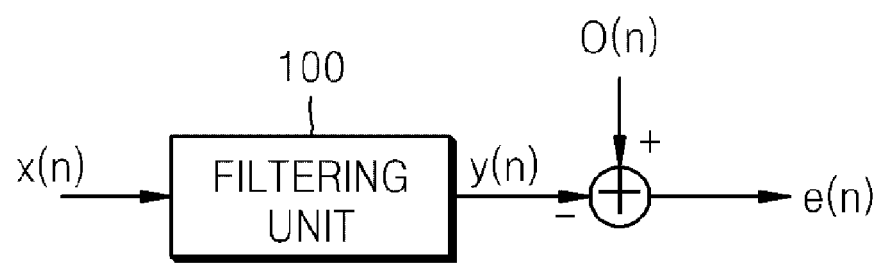
FIG. 1 is a view for explaining a motion compensation filtering operation according to an exemplary embodiment of the present invention.

FIG. 1 is a view for explaining a motion compensation filtering operation according to an exemplary embodiment of the present invention.

Conventionally, if x(n) denotes prediction data generated using motion compensation, and o(n) denotes original image data, residual data which corresponds to a difference between the prediction data x(n) and the original image data o(n) is compressed and encoded. Referring to FIG. 1, according to the present exemplary embodiment, the prediction data x(n) is filtered by a filtering unit 100 to generate filtered prediction data y(n). Image compression efficiency can be improved when the filtering unit 100 performs a filtering operation while minimizing an error e(n) between the filtered prediction data y(n) and the original image data o(n). By using information regarding pixels previously encoded, the filtering unit 100 computes weight values of a mask, and the weight values are used in the filtering operation. The filtering unit 100 can be realized in a decoding apparatus without having to separately transmit a significant amount of additional information, and an image can be restored using the same filtering operation performed in an encoding apparatus.

Figure 2:
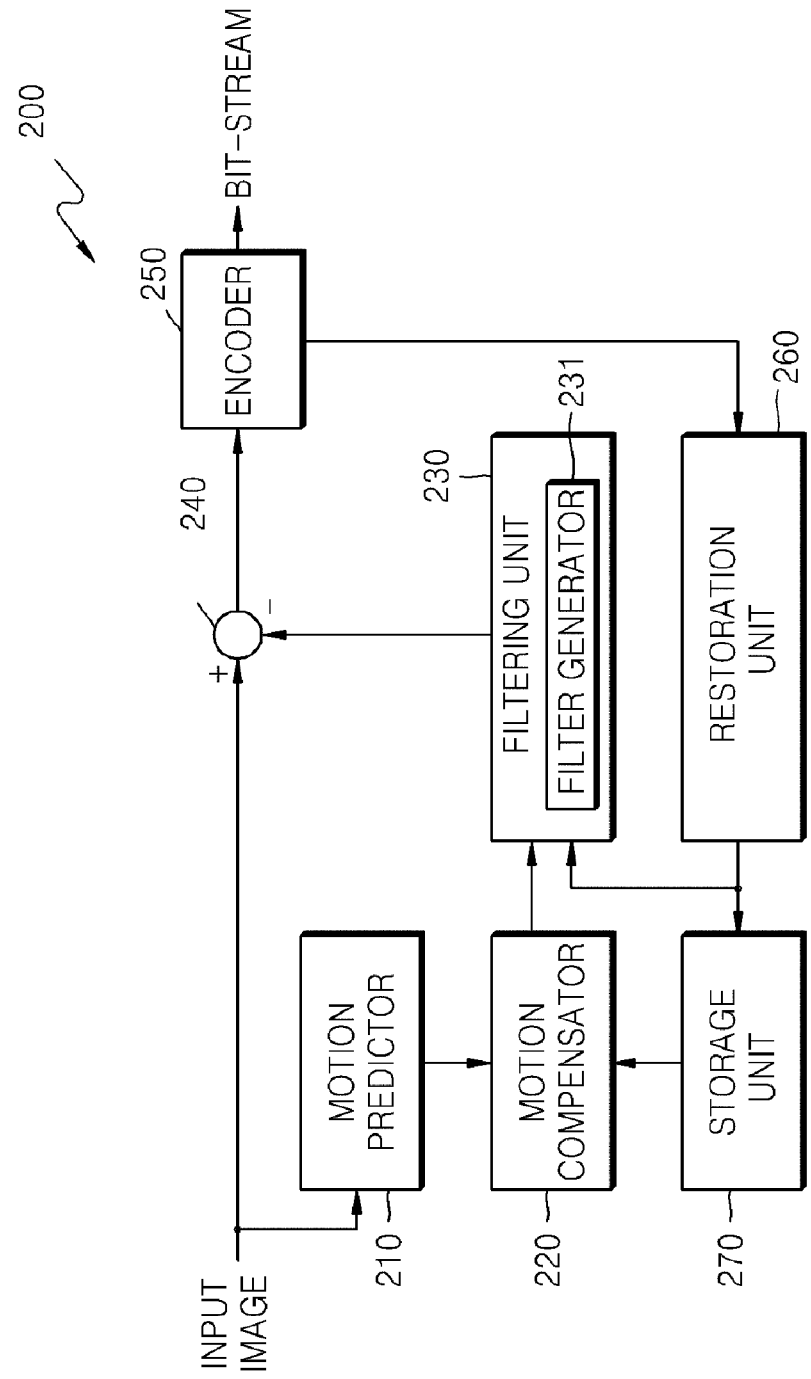
FIG. 2 is a block diagram of an image encoding apparatus according to an exemplary embodiment of the present invention.

FIG. 2 is a block diagram of an image encoding apparatus 200 according to an exemplary embodiment of the present invention.

Referring to FIG. 2, the image encoding apparatus 200 according to an exemplary embodiment of the present invention includes a motion predictor 210, a motion compensator 220, a filtering unit 230, a subtraction unit 240, an encoder 250, a restoration unit 260, and a storage unit 270.

The motion predictor 210 performs motion prediction using previous frame data stored in the storage unit 270 and generates a motion vector of a current block. The motion compensator 220 generates a prediction block for the current block upon obtaining data of a reference frame area (hereinafter, referred to as a "corresponding block"), indicated by the motion vector of the current block.

Figure 3:
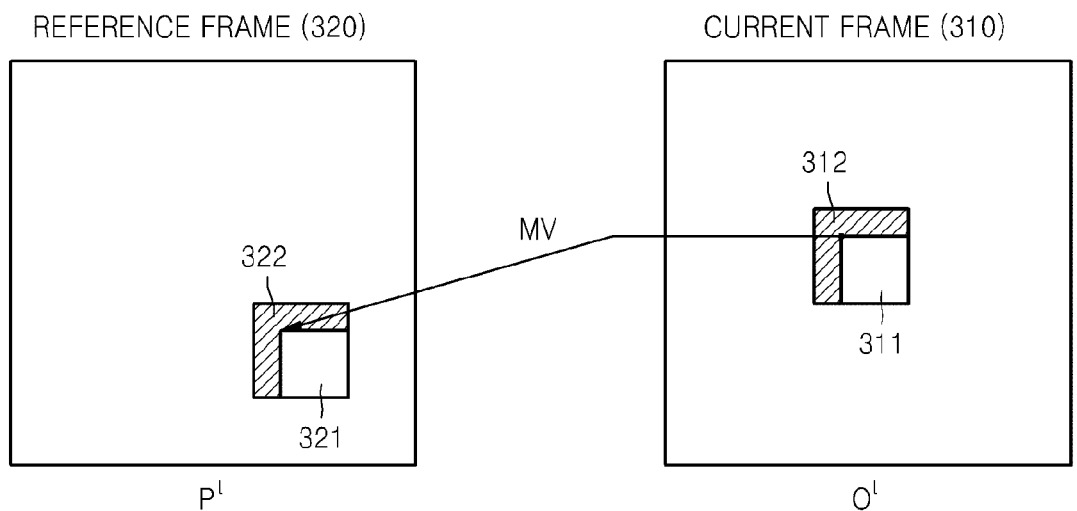
FIG. 3 is a view of a process of generating a prediction block, which is performed by a motion compensator by using a current block, according to an exemplary embodiment of the present invention.

FIG. 3 is a view for explaining a process of generating a prediction block, which is performed by the motion compensator 220 by using a current block, according to an exemplary embodiment of the present invention.

The motion predictor 210 searches a reference frame 320 to find a block having the smallest error with respect to a current block 311 of a current frame 310, thereby determining a corresponding block 321 for the current block 311. Then, the motion predictor 210 generates a motion vector MV which is a positional difference between the determined corresponding block 321 and the current block 311. The motion compensator 220 obtains data of the corresponding block 321 of the reference frame 320, that is indicated by the motion vector MV of the current block 311. Thus, the motion compensator 220 generates a prediction block for the current block 311. That is, the prediction block for the current block 311 is the corresponding block 321 of the reference frame 320.

The filtering unit 230 applies a mask having a specific size to the prediction block obtained using motion compensation, and then filters the prediction block. Specifically, the filtering unit 230 applies the mask around respective pixels constituting the prediction block and computes a weighted sum between weight values of the mask and pixel values of the pixels included in the mask, thereby filtering the respective pixel values of the prediction block. In addition, the filtering unit 230 includes a filter generator 231 which generates a filter by using pixels surrounding the current block 311 and pixels surrounding the corresponding block 321.

Figure 4:
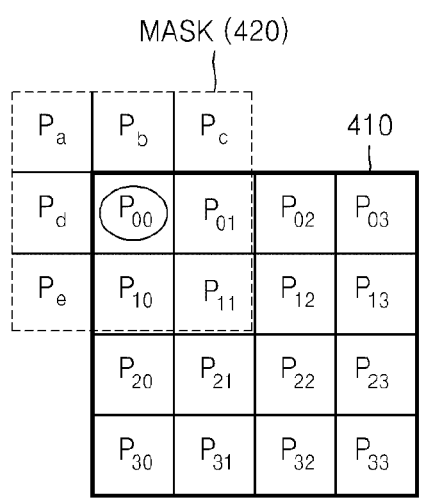
FIG. 4 is a view of a filtering operation for a prediction block, according to an exemplary embodiment of the present invention.
Figure 5A:
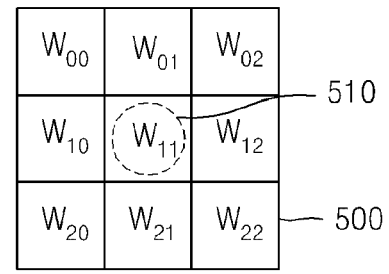
FIGS. 5A to 5D illustrate examples of masks used in a filtering operation for a prediction block of FIG. 4, according to exemplary embodiments of the present invention.

FIG. 4 is a view for explaining a filtering operation for a prediction block 410 according to an exemplary embodiment of the present invention. FIGS. 5A to 5D illustrate examples of masks used in the filtering operation for the prediction block of FIG. 4, according to exemplary embodiments of the present invention. In FIG. 4, the prediction block 410, which has a size of 4×4 and is generated using motion compensation, is filtered using a mask 420, which is illustrated in FIG. 5A. Herein, $P_{i,j}$ denotes a prediction pixel value at a position (i,j) (where i,j=0, 1, 2, 3) of the prediction block 410, and Pa to Pe denote surrounding pixels which have been encoded and restored prior to encoding the current block.

Referring to FIG. 4, the filtering unit 230 generates filtered prediction pixel values $P_{i,j}'$ by filtering the prediction pixel values $P_{i,j}$. In this process, the filtering unit 230 computes a weighted sum by adding the products of specific weight values and pixel values included in a mask 420 having a specific size according to the respective prediction pixel values of the prediction block 410. For example, when the mask 420 of FIG. 4 has a size of 3×3 and is applied to the prediction block 410 of FIG. 4 such that a prediction pixel value P00 at a position (0, 0) of the prediction block 410 is located in a center portion of the mask 420, 3×3 pixel values surrounding the prediction pixel value P00 are multiplied by weight values respectively assigned to the pixels. Then, the products are added to compute the filtered prediction pixel value P00'. If $W_{i,j}$ denotes a weight value assigned to a pixel position (i,j) of the mask 420, the filtered prediction pixel value P00' obtained by filtering the prediction pixel value P00 at the position (0,0) can be computed using the following equation: P00'=W00*Pa+W01*Pb+W02*Pc+W10*Pd+W11*P00+W12*P01+W20*Pe+W21*P10+W22*P11. Likewise, filtered prediction pixel values of the prediction block 410 can be computed such that the mask 500 is moved to match a center position 510 illustrated in FIG. 5A with a position of a prediction pixel value of the prediction block 410 currently being filtered. Then, pixel values of the mask 500 are multiplied by weight values for respective pixels of the mask 500, and the products are added.

Figure 5B:
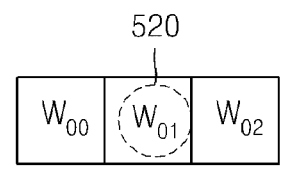
Figure 5C:
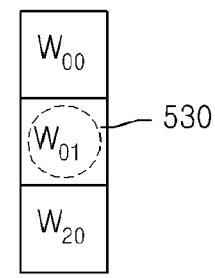
Figure 5D:
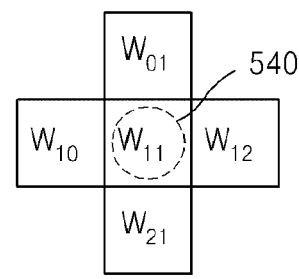

The mask shape and size is not limited to the 3×3 mask 500 of FIG. 5A, and thus any mask having a size of N×M (where N and M are positive integer numbers) may be used. For example, a one-dimensional mask having a size of N×1 or 1×M may be used. FIG. 5B illustrates a 3×1 mask, and FIG. 5C illustrates a 1×3 mask. FIG. 5D illustrates a mask obtained by combining the above one-dimensional masks illustrated in FIGS. 5B and 5C. Similar to the case of using the mask illustrated in FIG. 5A, when the masks illustrated in FIGS. 5B to 5D are used, prediction pixel values can be filtered, when center positions 520, 530, and 540 of the masks illustrated in FIGS. 5B to 5D, respectively, are matched with the prediction pixel value to be filtered, and a weighted sum is calculated by adding the products of pixel values of the masks and weight values assigned to the respective pixel positions in the mask. When N and M are equal to 1, the filtering operation is performed by multiplying a predetermined weight value by respective pixel values included in the prediction block without having to use surrounding pixels.

Meanwhile, weight values of the mask applied to the filtering operation of the prediction block are determined, so that there is a minimum difference between a filtered prediction block and an original pixel block.

If $O_{xy}^t$ denotes an original pixel block of a current block to be encoded in a current frame at time t, $P_{xy}^t$ denotes a prediction block of a reference frame generated using motion compensation for the current block, $W_{i,j}$ denotes a filter weight value at a position (i,j) (where i=0, 1, . . . , N−1, j=0, 1, . . . , M−1) in a mask having an N×M size, and $R_{xy}^t$ denotes a residual block corresponding to a difference between the original pixel block $O_{xy}^t$ and the filtered prediction block $P_{xy}^t$, then the original pixel block $O_{xy}^t$ can be expressed as Equation 1 by using a filtered prediction block and a residual block.

$$O_{xy}^t = \sum_{ij} W_{i,j} * P_{x+i,y+j}^t + R_{xy}^t \qquad \text{[Equation 1]}$$

As described above, the filter weight value $W_{i,j}$ is determined so that a prediction error is minimized. When a sum of squared error (SSE) is used as the prediction error, the SSE is computed by taking a sum of squares of pixel values of the residual block, as expressed by Equation 2.

$$SSE = \sum_{xy}(R_{xy}^t)^2 = \sum_{xy}\left(O_{xy}^t - \sum_{ij} W_{i,j} * P_{x+i,y+j}^t\right)^2 \qquad \text{[Equation 2]}$$

A weight value with a minimum SSE can be obtained using Equation 3, in which the SSE is partial-differentiated with respect to a weight value $W_{kl}$ at an arbitrary position (k,l) in a mask having an N×M size, and weight values are selected when the partial differential value is 0.

$$\frac{\partial SSE}{\partial W_{kl}} = \sum_{xy}\left(2*\left(O_{xy}^t - \sum_{ij} W_{i,j} * P_{x-i,y+j}^t\right)*(-P_{x+k,y+l}^t)\right) \qquad \text{[Equation 3]}$$
$$= \sum_{xy}(O_{xy}^t * P_{x+k,y+l}^t)^2 -$$
$$\sum_{ij}\left(W_{i,j} * \left(\sum_{xy} P_{x+k,y+l}^t * P_{x+i,y+j}^t\right)\right) = 0$$

Equation 3 can be expressed as Equation 4 by using a specific operator C representing a correlation and using a weight value matrix expression $W_{NM\times 1}$ of a mask.

$$C_{k,l}^{O^tP^t} - \sum_{ij}\left(W_{ij} * C_{i-k,j-l}^{P^tP^t}\right) = C_{k,l}^{O^tP^t} - C_{i-k,j-l}^{P^tP^t} \cdot W_{NM\times 1} = 0 \qquad \text{[Equation 4]}$$

Accordingly, the weight value matrix expression $W_{NM\times 1}$ of a mask having an N×M size can be expressed as Equation 5.

$$W_{NM\times 1} = [C_{i-k,j-l}^{P^tP^t}]^{-1} \cdot C_{k,l}^{O^tP^t} \qquad \text{[Equation 5]}$$

In conclusion, NM weight values in a mask having a size of N×M can be determined by calculating an NM linear equation using parameters of a prediction pixel value of a prediction block and pixel values of an original pixel block.

However, when the weight values of the mask are encoded using the pixel values of the current block, additional information on the weight values of the mask has to be transmitted to the decoding apparatus, resulting in an increase in the amount of data. Thus, compression efficiency may deteriorate. To address this problem, according to an exemplary embodiment of the present invention, surrounding pixels which have previously been encoded and restored are used to compute the weight values of the mask, so that the weight values of the mask can be determined in the decoding apparatus without having to transmit additional information on the weight values of the mask.

Specifically, referring back to FIG. 3, the filter generator 231 determines the weight values of the mask by using pixels 312 surrounding the current block 311 and pixels 322 surrounding the corresponding block 321. That is, the surrounding pixels 322 are filtered using the mask, and thus filtered pixel values of the surrounding pixels 322 are generated. An error is computed with respect to the pixel values of the surrounding pixels 312. The error is then partial-differentiated with respect to the weight values of the mask, thereby obtaining linear equations having parameters of the weight values of the mask. For example, when a 3×3 mask is used as illustrated in FIG. 5A, nine weight values of the 3×3 mask may be computed by using pixel pairs corresponding to at least nine pixels selected from the surrounding pixels 322 and the surrounding pixels 312.

Upon determining the weight values of the mask, the filtering unit 230 filters a motion-compensated prediction block using the mask.

Figure 6:
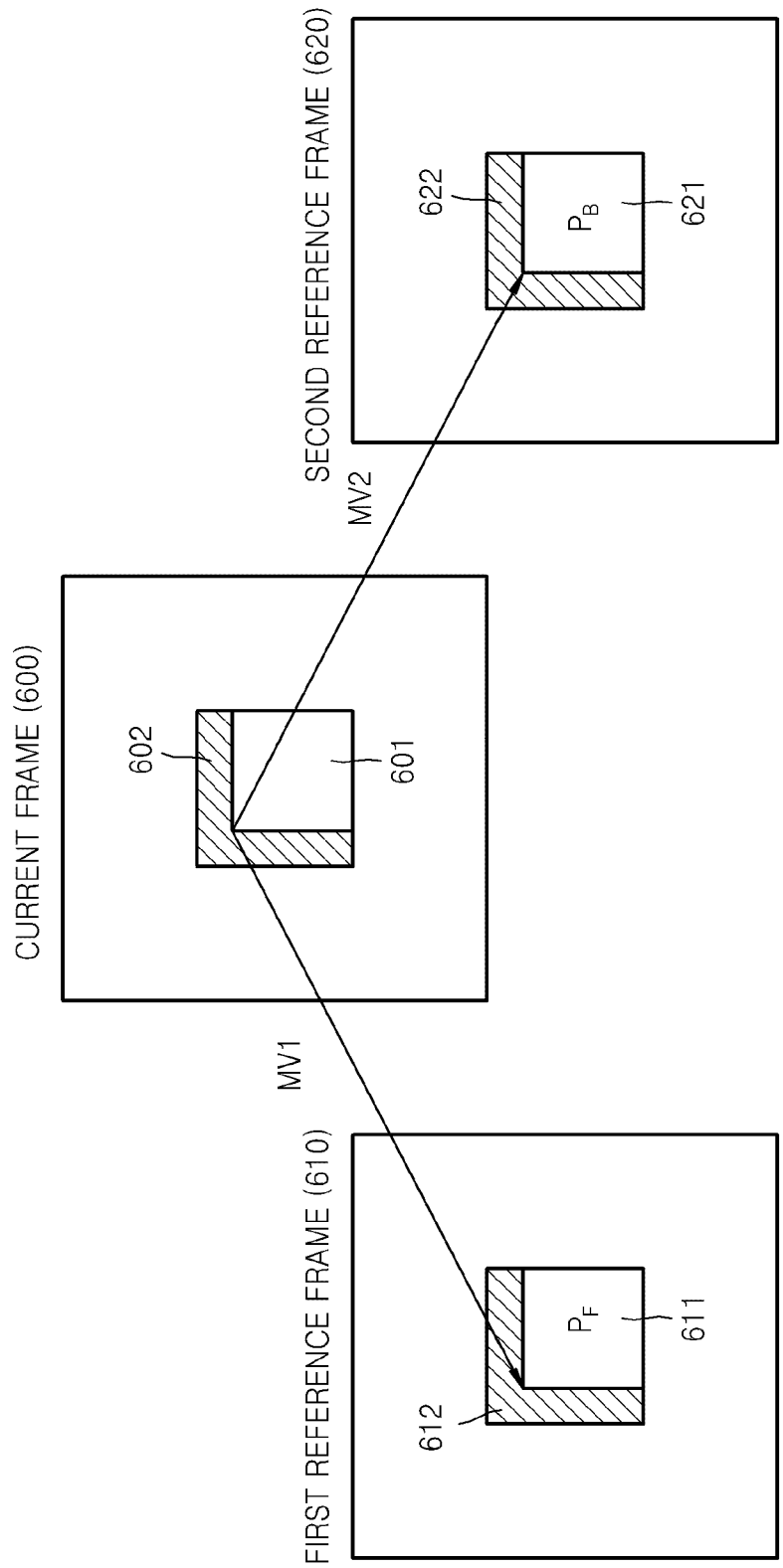
FIG. 6 is a view of a motion compensation filtering operation of a current block which can be bilaterally predicted, according to an exemplary embodiment of the present invention.

FIG. 6 is a view for explaining a motion compensation filtering operation of a current block 601 which can be bilaterally predicted according to an exemplary embodiment of the present invention.

The current block 311 described in FIG. 3 is a P-block using only one reference frame, and the weight values of the mask are determined using the pixels surrounding the corresponding block of the reference frame. Referring to FIG. 6, if the current block 601 is a B-block which can be bilaterally predicted, the motion compensation filtering operation of the current block 601 is performed in such a manner that first and second corresponding blocks 611 and 621 of respective first and second reference frames 610 and 620 are filtered using masks respectively generated for the first and second reference frames 610 and 620, and an average value of the first and second filtered corresponding blocks 611 and 621 is computed to generate a filtered prediction block.

Specifically, the filter generator 231 generates a first filter by computing weight values of a mask having a specific size, by using pixels 612 surrounding the first corresponding block 611 of the first reference frame 610 indicated by a first motion vector MV1 of the current block 601, and pixels 602 surrounding the current block 601. The filtering unit 230 filters the first corresponding block 611 by using the first filter and thus generates a filtered first corresponding block PF'.

Likewise, the filter generator 231 generates a second filter by computing weight values of a predetermined-sized mask, by using pixels 622 surrounding the second corresponding block 621 of the second reference frame 620 indicated by a second motion vector MV2 of the current block 601, and pixels 602 surrounding the current block 601. The filtering unit 230 filters the second corresponding block 621 by using the second filter and thus generates a filtered second corresponding block PB'.

Upon generating the filtered first and second corresponding blocks PF' and PB' as discussed above, the filtering unit 230 outputs an average value of the filtered first and second corresponding blocks PF' and PB', that is, (PF'+PB')/2, as a filtered motion compensation prediction value for the current block 601.

According to another exemplary embodiment, if the current block 601 is a B-block which can be bilaterally predicted in the motion compensation filtering operation, the filter generator 231 determines weight values of one mask by using an average value of the surrounding pixels 612 and 622 obtained from the first and second reference frames 610 and 620, and by using surrounding pixels 602. The filtering unit 230 may compute a filtered motion compensation value of the current block 601 by filtering the average value of the first and second corresponding blocks 611 and 621 using the determined weight values of the mask.

Specifically, the filter generator 231 computes an average value of first pixels N1 taken from the surrounding pixels 612 of the first reference frame 610, and second pixels N2 taken from the surrounding pixels 622 of the second reference frame 620. The average is given by (N1+N2)/2. The filter generator 231 determines weight values of the mask as described above using the average value (N1+N2)/2 and the surrounding pixels 602. The average value corresponds to the average value of each pixel at a specific pixel area, rather than an average value obtained by averaging all pixel values of the surrounding pixels.

Next, according to a bilateral motion compensation operation, the motion compensator 220 outputs an average value, i.e., (PF+PB)/2, of the first corresponding block 611 (PF) of the first reference frame 610 indicated by the first motion vector MV1 and the second corresponding block 621 (PB) of the second reference frame 620 indicated by the second motion vector MV2. Then, the filtering unit 230 filters the average value, i.e., (PF+PB)/2, between the first corresponding block 611 (PF) and the second corresponding block 621 (PB), and thus outputs a value corresponding to ((PF+PB)/2)'.

Figure 7:
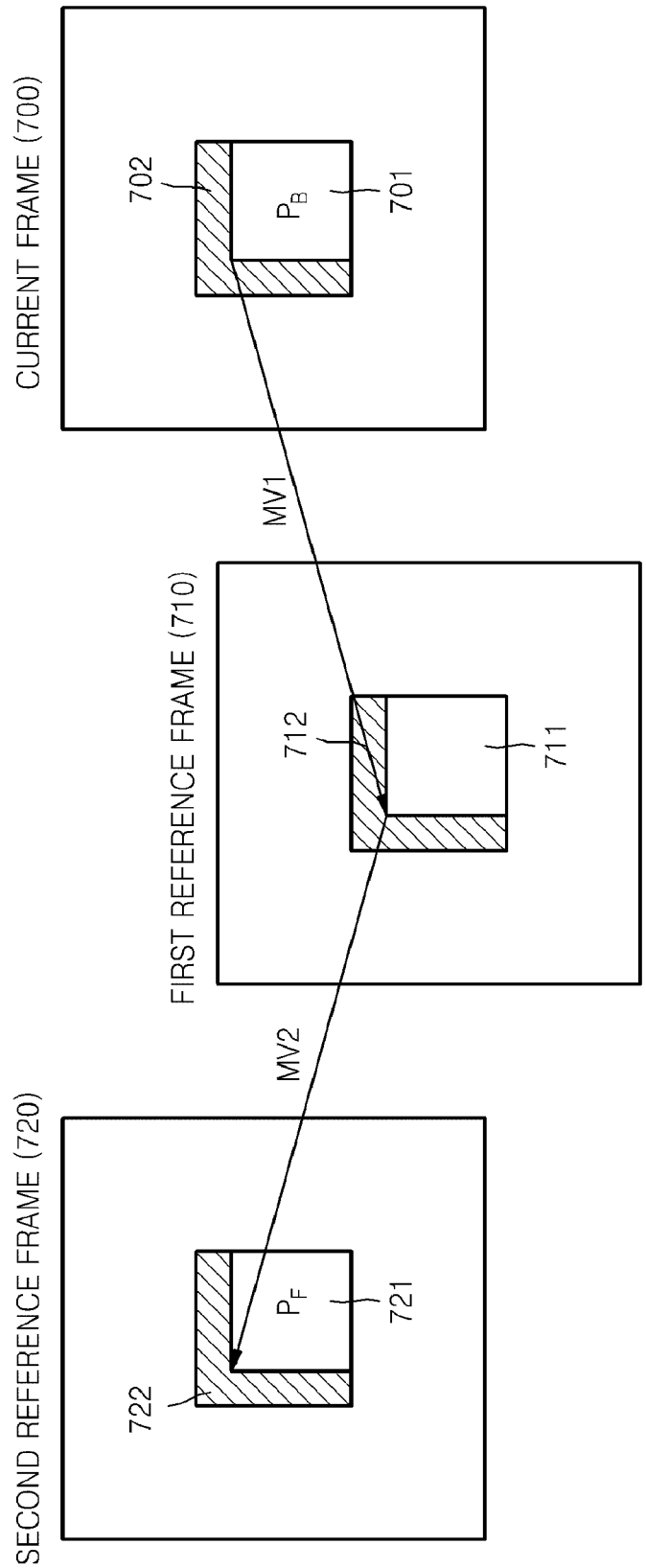
FIG. 7 is a view of a motion compensation filtering operation of a current block, according to another exemplary embodiment of the present invention.

FIG. 7 is a view for explaining a motion compensation filtering operation of a current block 701 according to another exemplary embodiment of the present invention.

Referring to FIG. 7, according to the current embodiment of the present invention, in order to determine weight values of a mask used in a first corresponding block 711 of a first reference frame 710 for a current block 701 of a frame 700, instead of using a correlation between pixels 702 surrounding the current block 701 and pixels 712 surrounding the first corresponding block 711, a correlation is used between the surrounding pixels 712 and pixels 722 surrounding a second corresponding block 721 of a second reference frame 720 indicated by a motion vector MV2 of the first corresponding block 711 generated using motion compensation. That is, in the filtering operation, a specific mask is applied to the surrounding pixels 722 of the second reference frame 720. Weight values of the mask are determined such that an error between the filtered surrounding pixels 722 and the surrounding pixels 712 is minimized. Then, the mask having the determined weight values is applied to the first corresponding block 711 of the first reference frame 710. Accordingly, a filtered motion compensation prediction value for the current block 701 is generated.

Referring back to FIG. 2, when the prediction block generated using motion compensation is filtered to output a filtered prediction block, the adder 240 computes a residual which is an error between a filtered prediction block and an original pixel block. The encoder 250 generates a bit-stream by converting, quantizing, and entropy-coding the residual. In particular, the encoder 250 according to the present exemplary embodiment may adaptively determine whether to filter motion-compensated prediction data for each motion block. Therefore, specific binary information indicating whether to perform a motion compensation filtering operation on a specific portion of the bit-stream may be inserted into each motion block, along with mask mode information used in the filtering operation. When a mask mode, that is, a mask shape, is predetermined by an encoder and a decoder, there may not be any need for separately transmitting the mask mode information. Furthermore, when the mask mode information is transmitted, there may not be a need to separately transmit the weight values of the mask as described above. Rather, a mask shape used in the encoder and the decoder is predetermined, and only mask shape information is transmitted. Thus, the decoding apparatus may perform the filtering operation by determining the weight values of the mask using the surrounding pixels as in the same manner as used in the encoding apparatus. For example, the masks of FIGS. 5A to 5D may be respectively assigned with binary values of '00', '01', '10', and '11', and one of the binary values may be inserted into a bit-stream to be transmitted, according to a mask shape used.

Figure 8:
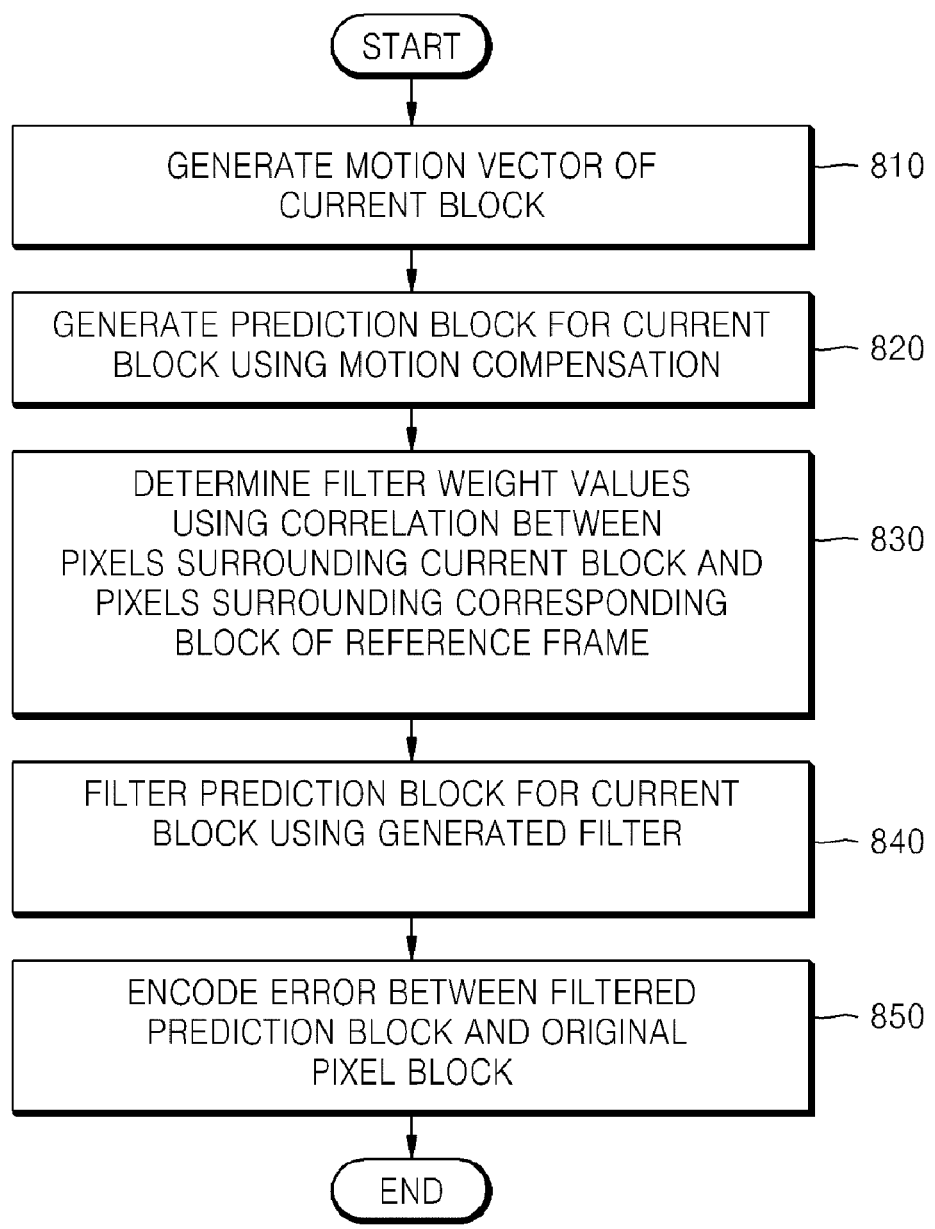
FIG. 8 is a flowchart of an image encoding method according to an exemplary embodiment of the present invention.

FIG. 8 is a flowchart of an image encoding method according to an exemplary embodiment of the present invention.

A motion vector of a current block to be encoded is generated using motion prediction (operation 810).

A prediction block for the current block is generated using motion compensation for obtaining a corresponding block of a reference frame indicated by the generated motion vector (operation 820).

A filter is generated by determining weight values of a predetermined-sized mask using a correlation between pixels surrounding the current block and pixels surrounding the corresponding block of the reference frame (operation 830). The weight values of the mask may be determined such that there is a minimum error between pixel values of the surrounding pixels of the corresponding block, that are generated when the surrounding pixels of the corresponding block of the reference frame are filtered, and pixel values of the pixels surrounding the current block.

A filtered prediction block is generated by filtering the prediction block for the current block by using the mask having the generated weight values (operation 840). In the filtering operation, a weighted sum is calculated by adding the products of the respective weight values of the predetermined-sized mask and the respective pixel values of the mask.

A bit-stream is generated by converting, quantizing, and entropy-encoding a residual between the filtered prediction block and an original pixel block (operation 850). The generated bit-stream has a specific portion in which binary information indicating whether to perform a motion compensation filtering operation or not is inserted for each motion block. Thus, a decoding apparatus can determine whether to perform the motion compensation filtering operation.

Figure 9:
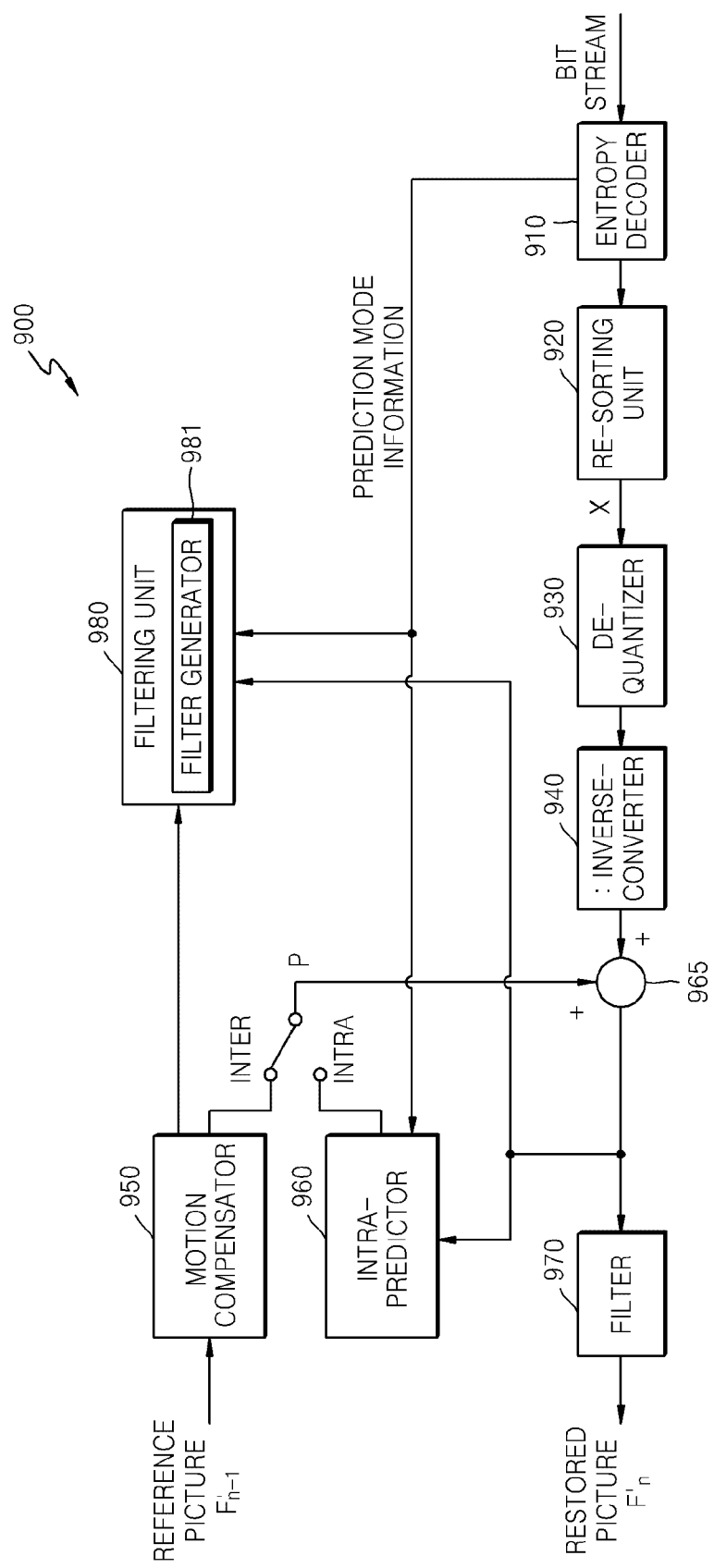
FIG. 9 is a block diagram of an image decoding apparatus according to an exemplary embodiment of the present invention.

FIG. 9 is a block diagram of an image decoding apparatus 900 according to an embodiment of the present invention.

Referring to FIG. 9, the image decoding apparatus 900 according to the current embodiment of the present invention includes an entropy decoder 910, a re-sorting unit 920, a de-quantizer 930, an inverse-converter 940, a motion compensator 950, an intra-predictor 960, an adder 965, and a filtering unit 980 which includes a filter generator 981.

The entropy decoder 910 receives a compressed bit-stream to be entropy-decoded, and generates quantized coefficients. The re-sorting unit 920 re-sorts the quantized coefficients. The de-quantizer 930 and the inverse-converter 940 de-quantize and inverse-convert the quantized coefficients, respectively, thereby restoring a residual.

The motion compensator 950 motion-compensates a current block which is determined as a motion block from the received bit-stream, thereby generating a prediction block.

The filtering unit 980 identifies a prediction mode of the current block to be decoded from the received bit-stream. Furthermore, the filtering unit 980 extracts motion compensation filtering information from the bit-stream, wherein the information indicates whether to perform the motion compensation filtering operation for the current block corresponding to the motion block. The filter generator 981 determines weight values of a mask by using surrounding pixels decoded prior to the decoding of the current block and surrounding pixels of the corresponding block of the reference frame referenced by the current block. The filtering unit 980 generates a prediction block in which the determined mask is filtered using the prediction block generated using motion compensation. The operations of the filtering unit 980 and the filter generator 981 included in the filtering unit 980 are the same as those of the filtering unit 230 and the filter generator 231 of FIG. 3. Thus, detailed descriptions thereof will be omitted.

The adder 965 adds the filtered motion compensation prediction block output from the filtering unit 980 and the restored residual, thereby restoring the current block.

Figure 10:
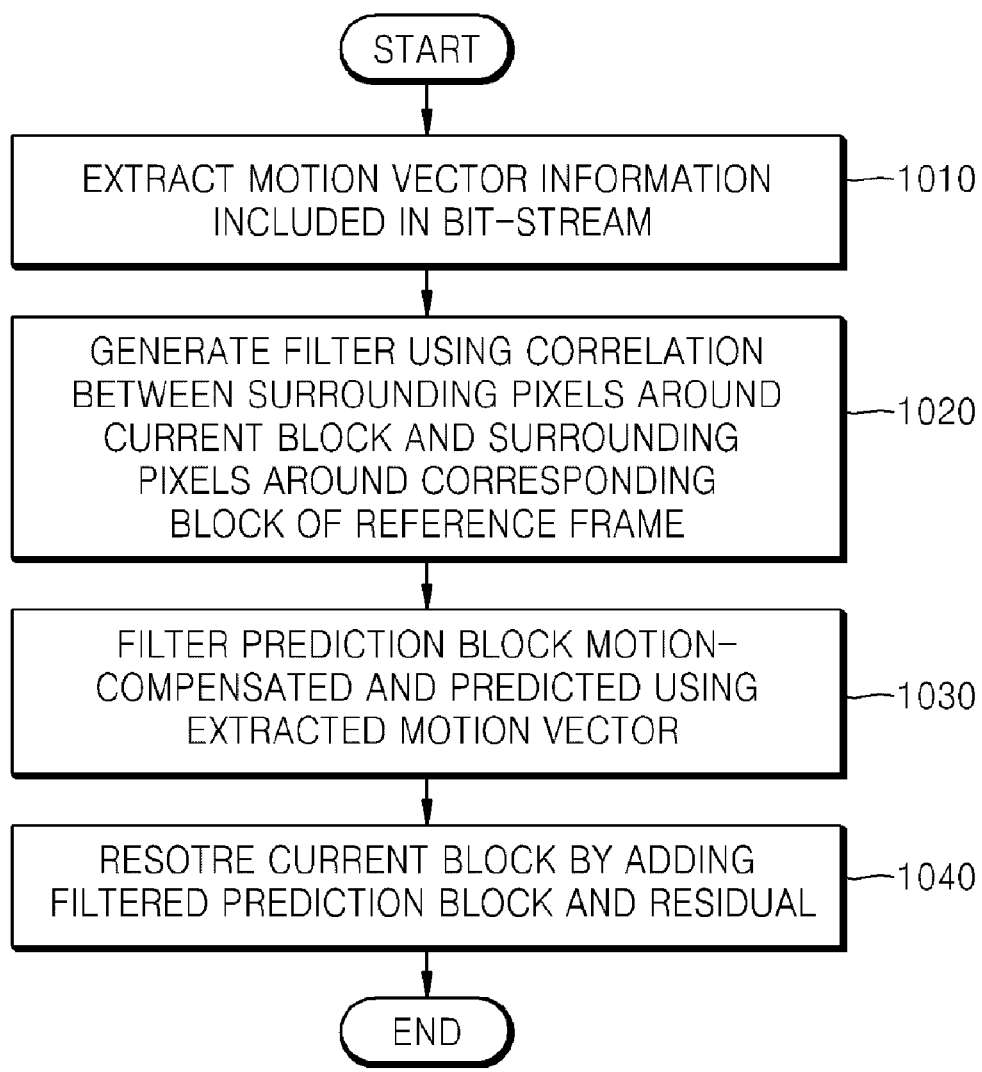
FIG. 10 is a flowchart of an image decoding method according to an exemplary embodiment of the present invention.

FIG. 10 is a flowchart of an image decoding method according to an embodiment of the present invention.

Referring to FIG. 10, a motion vector is extracted from a bit-stream, and a prediction block for a current block is generated through motion compensation using the extracted motion vector (operation 1010).

Weight values to be used in the prediction block, that is, weight values of a mask, are determined using a correlation between pixels surrounding the current block and pixels surrounding a corresponding block of a reference frame indicated by the motion vector of the current block (operation 1020).

By applying the mask to the prediction block generated using motion compensation, respective pixels of the prediction block are filtered by computing a weighted sum obtained by adding the products of surrounding pixels inside the mask and each weight value of the mask (operation 1030).

The current block is restored by adding the filtered prediction block and the restored residual (operation 1040).

According to exemplary embodiments of the present invention, motion-compensated prediction data is filtered to reduce a difference between the motion-compensated prediction data and original image data. Therefore, it is possible to decrease a size of residual data to be encoded and improve image compression efficiency.

In addition, by using information of surrounding pixels previously encoded and restored, weight values of a mask are computed to perform a filtering operation. Therefore, the weight values can be determined in a decoding apparatus without having to transmit additional information on the weight values.

An exemplary embodiment of the present invention can also be embodied as a computer readable program stored on a computer readable recording medium. The computer readable recording medium may be any data storage device that can store data which can be thereafter read by a computer system. Examples of the computer readable recording medium may include read-only memory (ROM), random-access memory (RAM), CD-ROMs, magnetic tapes, floppy disks, optical data storage devices. The computer readable recording medium can also be distributed over network coupled computer systems so that the computer readable program is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An image encoding method comprising:
   using a processor to perform a method including:
   generating a motion vector of a current block to be encoded using motion prediction of the current block;
   generating a prediction block for the current block using motion compensation for obtaining a corresponding block of a reference frame indicated by the motion vector;
   filtering the prediction block generated using the motion compensation; and
   encoding a difference between the filtered prediction block and the current block,
   wherein the filtering the prediction block comprises:
   generating a filter used for the prediction block by using a correlation between pixels surrounding the current block that have been previously encoded and restored, and pixels surrounding the corresponding block of the reference frame; and
   filtering respective pixel values of the prediction block using the generated filter.

2. The image encoding method of claim 1, wherein, in the generating of a filter, weight values of the filter are determined such that an error between the pixels surrounding the corresponding block of the reference frame and the pixels surrounding the current block, after the pixels surrounding the corresponding block of the reference frame are filtered using the filter, is minimized.

3. The image encoding method of claim 1, wherein the filtering of respective pixel values comprises:
   applying a mask having a specific size to each pixel constituting the prediction block to be filtered; and
   multiplying weight values of the mask by corresponding pixels of the prediction block included in the mask and summing the multiplied values, thereby filtering each pixel value of the prediction block.

4. The image encoding method of claim 3, wherein a size of the mask is one of N×M (where N and M are positive integer numbers), 1×M, N×1, and 1×1.

5. The image encoding method of claim 1, wherein the filtering the prediction block comprises:
   generating a first filter by using pixels surrounding a first corresponding block of a first reference frame among two reference frames referenced by the current frame, and the pixels surrounding the current block, and generating a filtered first corresponding block by filtering the first corresponding block using the first filter, if the current block is a motion block that can be predicted bilaterally;

generating a second filter by using pixels surrounding a second corresponding block of a second reference frame among the two reference frames referenced by the current block, and the pixels surrounding the current block, and generating a filtered second corresponding block by filtering the second corresponding block using the second filter; and outputting an average value between the filtered first corresponding block and the filtered second corresponding block as a filtered prediction block for the current block.

6. The image encoding method of claim 1, wherein the filtering the prediction block comprises:

computing an average value between pixels surrounding a first corresponding block of a first reference frame referenced by the current block, and pixels surrounding a second corresponding block of a second reference frame, if the current block is a motion block that can be predicted bilaterally;

generating a filter by using an average value between the pixels surrounding the current block and the pixels surrounding the first and second corresponding blocks; and outputting the filtered prediction block for the current block by filtering the average value between the first corresponding block and the second corresponding block using the generated filter.

7. The image encoding method of claim 1, wherein, in the filtering the prediction block, a correlation between first pixels surrounding a first corresponding block of a first reference frame, and second pixels surrounding a second corresponding block of a second reference frame indicated by a motion vector of the first corresponding block of the first reference frame, is used.

8. The image encoding method of claim 1, wherein the encoding comprises inserting binary information, which indicates whether to perform a motion compensation filtering operation on the current block, into a specific portion of a bit-stream.

9. An image encoding apparatus comprising:

a motion predictor that generates a motion vector of a current block to be encoded through motion prediction of the current block;

a motion compensator that generates a prediction block for the current block using motion compensation, by obtaining a corresponding block of a reference frame indicated by the motion vector;

a filtering unit that filters the prediction block generated by the motion compensator; and an encoder that encodes a difference between the filtered prediction block and the current block, wherein one or more of the motion predictor, motion compensator, filtering unit, and encoder are implemented on a processor, and the filtering unit generates a filter for filtering the generated prediction block by using a correlation between pixels surrounding the current block that have been previously encoded and restored, and pixels surrounding the corresponding block of the reference frame; and filters respective pixel values of the generated prediction block using the generated filter.

10. The image encoding apparatus of claim 9, wherein the filtering unit determines weight values of the filter such that an error is minimized between the pixels surrounding the corresponding block of the reference frame and the pixels surrounding the current block, after the pixels surrounding the corresponding block of the reference frame are filtered using the filter.

11. The image encoding apparatus of claim 9, wherein the filtering unit applies a mask having a specific size to each pixel constituting the prediction block to be filtered, and multiplies weight values of the mask by corresponding pixels of the prediction block included in the mask, and sums the multiplied values, thereby filtering each pixel value of the prediction block.

12. The image encoding apparatus of claim 9, wherein the filtering unit generates, a first filter using pixels surrounding a first corresponding block of a first reference frame among two reference frames referenced by the current frame, and the pixels surrounding the current block, if the current block is a motion block that can be predicted bilaterally, and generates a filtered first corresponding block by filtering the first corresponding block using the first filter, generates a second filter by using pixels surrounding a second corresponding block of a second reference frame among the two reference frames referenced by the current block, and the pixels surrounding the current block, and generates a filtered second corresponding block by filtering the second corresponding block using the second filter, and outputs an average value between the filtered first corresponding block and the filtered second corresponding block as a filtered prediction block for the current block.

13. The image encoding apparatus of claim 9, wherein the filtering unit computes, an average value between pixels surrounding a first corresponding block of a first reference frame referenced by the current block and pixels surrounding a second corresponding block of a second reference frame, if the current block is a motion block that can be predicted bilaterally, generates a filter by using an average value between the pixels surrounding the current block and the pixels surrounding the first and second corresponding blocks, and outputs the filtered prediction block for the current block by filtering the average value between the first corresponding block and the second corresponding block using the filter.

14. The image encoding apparatus of claim 9, wherein the filtering unit generates a filter used for filtering the prediction block, using a correlation between first pixels surrounding a first corresponding block of a first reference frame and second pixels surrounding a second corresponding block of a second reference frame indicated by a motion vector of the first corresponding block of the first reference frame.

15. The image encoding apparatus of claim 9, wherein the encoder inserts binary information, which indicates whether to perform a motion compensation filtering operation on the current block, into a specific portion of a bit-stream.

16. An image decoding method comprising:

using a processor to perform a method including:

generating a prediction block for a current block to be decoded through motion compensation using a motion vector extracted from a received bit-stream;

generating a filter to be used for the prediction block using a correlation between pixels surrounding the current block and pixels surrounding a corresponding block of a reference frame indicated by the motion vector;

generating a filtered prediction block by filtering the prediction block using the filter; and restoring the current block by adding the filtered prediction block and a restored residual, wherein, the generating of a filter comprises determining weight values of the filter such that an error is minimized between pixels surrounding the corresponding block of the reference frame and pixels surrounding the current block, after the pixels surrounding the corresponding block of the reference frame are filtered using the filter.

17. The image decoding method of claim 16, wherein, the generating of a filtered prediction block comprises applying a mask having a specific size to each pixel constituting the prediction block, and multiplying weight values of the mask by pixels surrounding the prediction block included in the mask and summing the multiplied values, thereby filtering each pixel value of the prediction block.

18. An image decoding apparatus comprising:
a motion compensator that generates a prediction block for a current block to be decoded through motion compensation using a motion vector extracted from a received bit-stream;
a filtering unit that generates a filter to be used for the prediction block using a correlation between pixels surrounding the current block and pixels surrounding a corresponding block of a reference frame indicated by the motion vector, the filtering unit generating a filtered prediction block by filtering the generated prediction block using the filter; and
an adder that restores the current block by adding the filtered prediction block and a restored residual,
wherein one or more of the motion compensator, filtering unit, and adder are implemented on a processor, and
the filtering unit determines weight values of the filter such that an error is minimized between pixels surrounding the corresponding block of the reference frame and pixels surrounding the current block, after the surrounding pixels of the corresponding block of the reference frame are filtered using the filter.

19. The image decoding apparatus of claim 18, wherein the filtering unit applies a mask having a specific size to each pixel constituting the prediction block, multiplies weight values of the mask by pixels surrounding the prediction block included in the mask, and sums the multiplied values, thereby filtering each pixel value of the prediction block.

* * * * *